United States Patent
Tan et al.

(10) Patent No.: US 7,243,315 B2
(45) Date of Patent: Jul. 10, 2007

(54) METHODS FOR PRODUCING STRUCTURED APPLICATION-SPECIFIC INTEGRATED CIRCUITS THAT ARE EQUIVALENT TO FIELD-PROGRAMMABLE GATE ARRAYS

(75) Inventors: Kim Pin Tan, Penang (MY); Kar Keng Chua, Penang (MY)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 11/141,941

(22) Filed: May 31, 2005

(65) Prior Publication Data

US 2006/0271899 A1 Nov. 30, 2006

(51) Int. Cl.
*G06F 17/50* (2006.01)
(52) U.S. Cl. .................... 716/2; 716/6; 716/10; 716/17
(58) Field of Classification Search ................ 716/2, 716/4, 6, 10, 11, 12, 17
See application file for complete search history.

(56) References Cited

U.S. PATENT DOCUMENTS

| | | | |
|---|---|---|---|
| 5,825,202 A | 10/1998 | Tavana et al. | |
| 5,874,834 A | 2/1999 | New | |
| 6,091,262 A | 7/2000 | New | |
| 6,094,065 A | 7/2000 | Tavana et al. | |
| 6,242,945 B1 | 6/2001 | New | |
| 6,490,707 B1 | 12/2002 | Baxter | |
| 6,515,509 B1 | 2/2003 | Baxter | |
| 6,526,563 B1 | 2/2003 | Baxter | |
| 2004/0111691 A1 | 6/2004 | Tan et al. | |
| 2004/0261052 A1 | 12/2004 | Perry et al. | |
| 2006/0015313 A1* | 1/2006 | Wang et al. | ............... 703/14 |

OTHER PUBLICATIONS

"LCELL WYSIWYG Description for the Stratix II Family", Version 1.1, Altera Corporation, Mar. 22, 2004.
"HardCopy II Structured ASIC" [Online] Jan. 2005, pp. 1-4, XP002394963 Retrieved from the Internet: URL:http//www.altera.com/literature/wp/wp-harcopyii.pdf> [retrieved on Aug. 16, 2006].
Bismuth, A.: "Design of structured ASIC integrated circuits" Electronik Weka-Fachzeitschriften Germany, vol. 54; No. 3, Feb. 8, 2005, pp. 46-50, XP008067632 ISSN: 0013-5658.
"HardCopy Series Handbook, vol. 1, Section IV. Hardware Design Considerations, Chapter 13. Back-End Design Flow for HardCopy Series Devices" Altera Corporation, [Online] Jan. 2005, XP008067906 Retrieved from the Internet: URL:http//64.233.183.104/search?=cache:VUEVW6qMJGIJ:www.altera.com.cn/literature/hb/hrd/hc_h5v1_03.pdf+%22Back-end+design+flow+for+hardcopy+series+devices%22&hl=nl&ct=clmnk&cd=4> [retrieved on Aug. 17, 2006].

* cited by examiner

*Primary Examiner*—Thuan Do
(74) *Attorney, Agent, or Firm*—Fish & Neave IP Group Ropes & Gray LLP; Robert R. Jackson (57) ABSTRACT

As part of a process for producing a structured ASIC that is functionally equivalent to an FPGA that has been programmed to perform a user's logic design, a compilation of that design that has been prepared for ASIC implementation is converted to a physical layout of the structured ASIC. The production of this physical layout honors timing constraints supplied by the user, and also preserves functional equivalence to the reference programmed FPGA. The structured ASIC can be manufactured from the physical layout produced.

16 Claims, 5 Drawing Sheets

METHODS FOR PRODUCING STRUCTURED APPLICATION-SPECIFIC INTEGRATED CIRCUITS THAT ARE EQUIVALENT TO FIELD-PROGRAMMABLE GATE ARRAYS

BACKGROUND OF THE INVENTION

This invention relates to application-specific integrated circuits ("ASICs"), and more particularly to the type of ASICs that are sometimes known as structured ASICs.

Schleicher et al. U.S. patent application Ser. No. 11/097,633, filed Apr. 1, 2005 shows methods for working with a user's logic design to produce data that can be used to produce functionally equivalent implementations of the user's logic design in a programmed field-programmable gate array ("FPGA") and a structured ASIC. (The Schleicher et al. reference is hereby incorporated by reference herein in its entirety.) For example, in the case of an FPGA, the Schleicher et al. reference shows a succession of steps for manipulating the user's logic design to produce data for use in programming the FPGA to implement that logic design. In the case of a structured ASIC, the Schleicher et al. reference shows a succession of steps for manipulating the user's logic design to produce what the reference calls handoff design files. These are design files that are intended to closely specify how the user's logic design will be actually implemented in a structured ASIC in order to help ensure functional equivalence of this implementation with an FPGA implementation of the same user's logic design. It is recognized, however, that additional work needs to be done on these handoff design files in order to turn them into the final data needed to control production of the structured ASIC. This additional work, referred to in the Schleicher et al. reference as the back end of the structured ASIC design process, is the subject of this invention. Again, as in the Schleicher et al. reference, important goals of this invention are (1) preservation of highly reliable functional equivalence between the resulting structured ASIC and an FPGA implementing the same user's logic design, (2) efficient use of the resources of the structured ASIC, and (3) rapid completion of back end task to facilitate prompt availability of the finished structured ASIC product.

SUMMARY OF THE INVENTION

In accordance with the present invention, methods of producing a physical layout for a structured ASIC that is functionally equivalent to an FPGA programmed to implement a user's logic design include retrieving, from a library of physical layouts of structured ASIC equivalents of FPGA circuit blocks, the physical layouts for the various circuit blocks that are present in a netlist for a structured ASIC implementation of the user's logic design. The retrieved physical layouts of the blocks are placed on a template for a structured ASIC. Interconnections between the physical layout blocks are laid out on the structured ASIC template in accordance with the netlist.

At least some of the steps of the methods of the invention may be performed for compliance with one or more timing constraints supplied by the user.

The methods may include adding to the netlist circuitry for facilitating testing of the structured ASIC after fabrication.

The methods may include any one or more of cross-talk closure, antenna closure, timing optimization, design rule checking, layout vs. schematic checking, and static timing analysis.

Further features of the invention, its nature and various advantages, will be more apparent from the accompanying drawings and the following detailed description.

DETAILED DESCRIPTION

Figure 1:
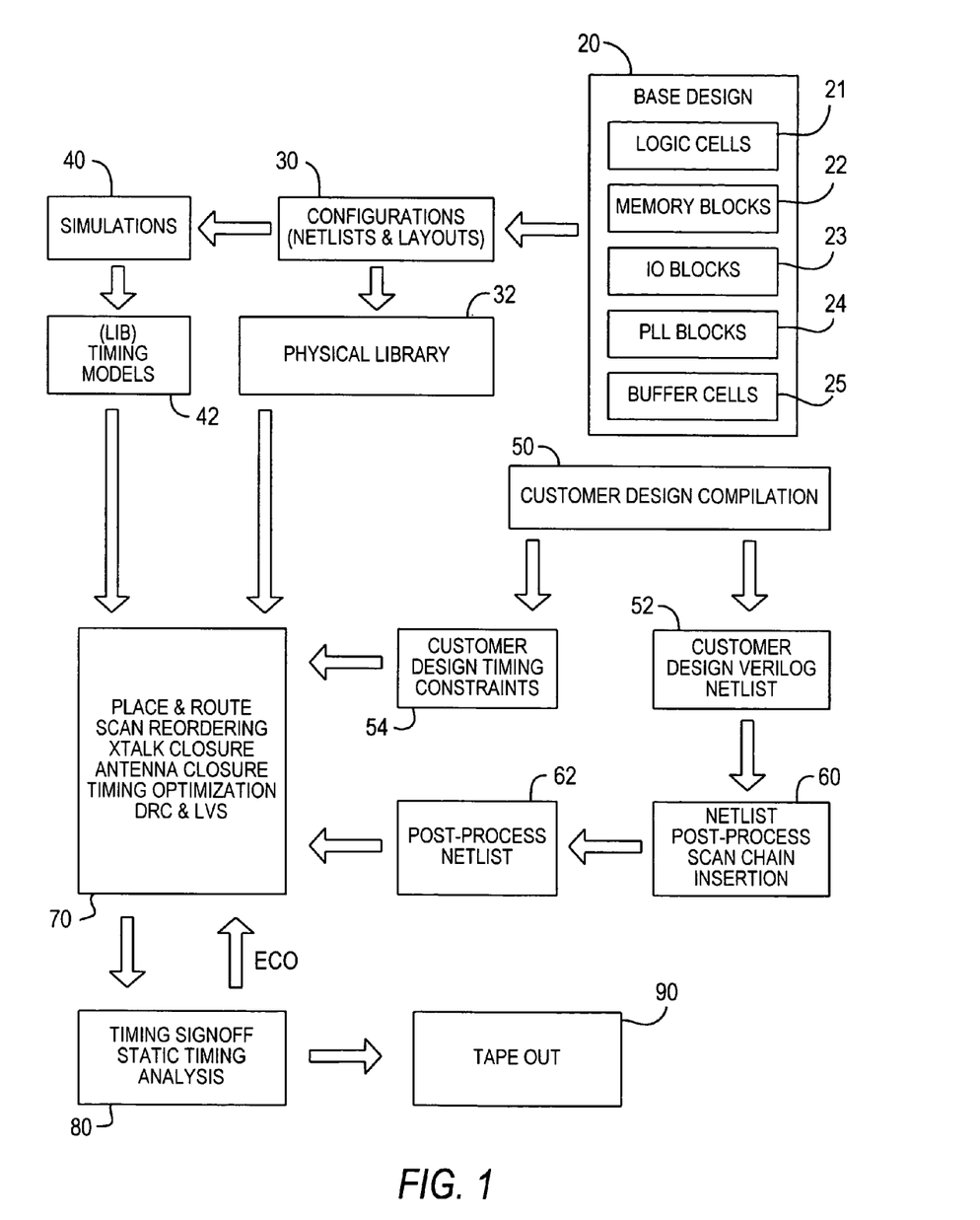
FIG. 1 is a simplified flow chart of an illustrative embodiment of methods in accordance with the invention.

A few of the elements shown in FIG. 1 repeat or summarize what is shown in the above-mentioned Schleicher et al. reference. For example, flow element 50 summarizes the Schleicher et al. steps leading to production of handoff design files 860 in any of FIG. 6, 7a, or 7b of Schleicher et al., and flow elements 52 and 54 summarize important aspects of the Schleicher et al. handoff design files 860. (In the present disclosure the term "customer" is sometimes used as a synonym for user.) Thus flow elements 52 and 54 herein reflect the fact that Schleicher et al.'s handoff design files preferably include (1) a netlist (e.g., a Verilog netlist) of the user's logic design that is oriented toward a structured ASIC implementation of that design, and (2) timing constraints from the user's logic design.

Several of the flow elements in FIG. 1 (i.e., elements 20, 30, 32, 40, and 42) relate to resources that can be (and preferably are) prepared in advance of receiving the handoff design files (860 in Schleicher et al.; 52/54 herein) for any particular user's logic design. These are resources that are used to facilitate production of a structured ASIC that will be functionally equivalent to an FPGA implementing whatever user's logic design is presented via handoff design files 52/54. The resources referred to in this paragraph are library resources that only need to be developed once (although improvements and/or additions may be made to these library resources from time to time). These elements will now be described in more detail.

Element 20 is a list of various types of circuit blocks that can be employed in a user's logic design. These include logic cells 21, memory blocks 22, input/output ("IO" or "I/O") blocks 23, phase-locked loop ("PLL") blocks 24, and buffer cells 25. It will be understood that this list is only exemplary, and that other types of blocks may be included if desired. For example, other types of blocks that may be included are delay-locked loop ("DLL") blocks, digital signal processing ("DSP") blocks, etc.

For each of the blocks 20 that a user may employ in the user's logic design, at least one structured ASIC configuration 30 has been developed in advance. Some types of blocks that a user may employ in an FPGA implementation of the user's logic design may be basically duplicated in a related structured ASIC. This may be true, for example, for memory blocks 22, IO blocks 23, PLL blocks 24, and buffer cells 25. Thus, for example, for each type of memory block 22 that is provided for on an FPGA, at least one structured ASIC configuration 30 of that type of memory block has been developed. The same is true for each type of FPGA IO block 23, each type of FPGA PLL block 24, and each type of FPGA buffer cell 25. In each case, at least one functionally equivalent (often structurally similar) structured ASIC equivalent configuration 30 has been developed.

It should be noted in connection with the foregoing that configurations 30 may need to include several different forms of some of the types of blocks discussed in the preceding paragraph. For example, IO blocks 23 may differ based on their location on the final product (e.g., whether the block is on the left side, the right side, the top, or the bottom of the device). In their FPGA form, IO blocks 23 may have various programmable aspects (e.g., whether or not a register in the IO block is used, whether it is an input or an output block, etc.). Configurations 30 preferably include structured ASIC implementations for all of these possible combinations of IO block variables. As another example of this point, memory blocks 22 may exist in several different sizes. Moreover, in their FPGA form, at least one of these memory functions may be programmable in some respects (e.g., whether the memory is single port or dual port, the width of the input bus, the width of the output bus, etc.). Once again, configurations 30 preferably include structured ASIC implementations for all of these memory block size and functionality combinations that it is desired to support. As still another example, PLL blocks 24, in their FPGA form, may be programmable with respect, for example, to the amount of delay they provide. Configurations 30 preferably include structured ASIC implementations of all of these PLL block possibilities that it is desired to support. The same may be true for buffer cells 25, which, in the FPGA form, may be programmable with respect to strength.

Because the devices that are the "target" of this invention are structured ASICs, those devices always include the same basic template circuitry. For circuit blocks of the types discussed in the two preceding paragraphs, this template circuitry includes, at various fixed locations, the basic circuitry of what are believed to be suitable numbers of instances of these various types of blocks. For example, this structured ASIC template circuitry may include the basic circuitry of one or more types of IO blocks 23 along the left side of the template, the basic circuitry of more of those blocks 23 along the top of the device, and so on. The structured ASIC template circuitry may similarly include the basic circuitry of several instances of several types of memory blocks 22 at fixed locations in the template. The aspects of these (and other similar "non-logic" blocks such as 24 and 25) that are programmable in their FPGA form are implemented in the structured ASIC by appropriately customizing just a few of the masks that are used to make the structured ASIC. The other masks (i.e., those for the basic or template circuitry) are always the same or at least substantially the same. The customized masks are also used to provide customized interconnections among the various circuit blocks. (Of course, there may be several different structured ASIC target products, and these may have different templates supporting different ranges of circuit capabilities. But for each target product, the template circuitry is always the same or at least substantially the same. Only a few of the masks used to make the structured ASIC product need to be customized in order to implement a particular customer circuit design in the structured ASIC.)

Logic cells 21 are handled somewhat differently (but only somewhat differently) than has been described above. As the Schleicher et al. reference makes clear, FPGA logic cells tend to be relatively large blocks of circuitry. For example, an FPGA logic cell (called an ALE in the Schleicher et al. reference) may include look-up table circuitry that can provide an output signal that is any logical combination of up to six input signals. These large ALEs are not, per se, duplicated in a structured ASIC in accordance with this invention. Instead, the structured ASIC template circuitry includes the rudiments or basic circuitry of many much smaller logic cells (called HLEs in the Schleicher et al. reference). One HLE or several nearby or adjacent HLEs are used together to perform the function(s) of an FPGA ALE. (Several HLEs that are used together in this way are called a cluster of HLEs or a CHLE.) A CHLE may be limited to a maximum of six HLEs. Because of the limited functionality of each HLE, and the limited number of HLEs allowed in one CHLE, one CHLE is only guaranteed to be able to provide any logical combination of four inputs (not six inputs, as is possible for one ALE). One CHLE can provide some combinations of five or six inputs. But it will require two or more CHLEs to provide other combinations of five and six inputs. In any event, configurations 30 preferably include at least one structured ASIC (i.e., HLE/CHLE) implementation of each four-input (and smaller) logic function that an FPGA ALE can provide. Configurations 30 may also include at least one structured ASIC implementation of some of the five- and six-input logic functions that an FPGA ALE can provide. Other five-input and six-input functions for which configurations 30 are not provided can be implemented by reducing them to multiple functions, each with fewer inputs. For example, a six-input function for which no structured ASIC configuration 30 has been provided may be implementable by multiple five- and/or four-input functions for which configurations have been provided.

To briefly summarize the foregoing paragraph, configurations 30 include at least one structured ASIC (i.e., HLE/CHLE) implementation of all two-input, three-input, and four-input logic functions that an FPGA ALE can provide. Configurations 30 may also include at least one structured ASIC implementation of some of the five- and/or six-input logic functions that an FPGA ALE can provide.

The phrase "at least one" has been used several times in the above discussion because more than one structured ASIC configuration 30 may have been developed for at least some of the starting FPGA circuit blocks 20. As just one example of this, there may be more than one known structured ASIC HLE/CHLE implementation of a particular FPGA four-input look-up table function 21. All of those known structured ASIC implementations are preferably included in flow element 30 as possible alternatives for implementing that four-input logic function. There can be (and preferably are) many thousands (e.g., 30,000) of configurations 30 for structured ASIC HLE/CHLE implementations of logic cells 21. Having such large numbers of pre-built library models is desirable for such purposes as reducing customer design turn-around time.

Other things that configurations 30 may include are structured ASIC (i.e., HLE/CHLE) implementations of FPGA registers and FPGA DSP blocks.

To further summarize the above discussion of flow element 30, that element produces or represents the production of a netlist and layout for at least one structured ASIC equivalent of each type of FPGA circuit block in flow element 20. Again, this may be several types and configurations of memory blocks 22, several types and configurations of IO blocks 23, one or more types and configurations of PLL blocks 24, one or more types and configurations of buffer cells 25, preferably many thousands of differently configured logic cells 21, etc. The "layouts" that are part of configurations 30 contain the complete physical informations needed for a structured ASIC implementation of each such configuration. Each of configurations 30 is further processed as will now be described.

For each of configurations 30, a structured ASIC physical library element is developed for inclusion in physical library flow element 32. Each physical library element (which may also be referred to by reference member 32) is the above-mentioned structured ASIC layout for the corresponding circuit block. As should be apparent from the foregoing discussion of flow element 30, there may be more than one physical library element 32 for each type of starting circuit block. For example, an IO block 23 of a given type may appear in four versions in physical library 32: a first version for use if the IO block is on the left-hand side of the structured ASIC, a second version for use if the IO block is on the right-hand side, a third version for use if the IO block is on the top of the structured ASIC, and a fourth version if the IO block is on the bottom of the structured ASIC. And there may be more than four versions of this type of IO block 23 in library 32 if, for example, this type of IO block is programmable in one or more respects in its FPGA form. The same will be true for other types of starting blocks 20 as those blocks are represented in library 32. In sum, there will be a physical library element 32 for each of configurations 30.

To speed-up operation of flow element 70 (described later), the complete physical information of the layouts in library 32 may be converted to a so-called "frame view" for at least some uses (especially place and route operations) in flow element 70. The frame view of a library element 32 only contains the ports and blockage information for each library element. The place and route portion of flow element 70 uses these simplified, frame-view layouts to do all the place and route steps. Eventually, however, the place and route tool uses the complete layouts (so-called "cell view") to dump out the final database for tape out 90.

Timing information may be needed for at least some of structured ASIC physical library elements 32. Accordingly, each configuration 30 for which such timing information will be needed is processed in simulation flow element 40. This flow element simulates the performance of each configuration 30 that it operates on. For example, flow element 40 uses the layouts of configurations 30 to extract RC information. Flow element 40 then uses these RC files, together with the netlists of configurations 30, to simulate the timing behavior of the configurations. The timing behavior of each block is then converted to "LIBERTY" (or "LIB") format (an industry-standard format) that can be understood by the place and route tool of flow element 70 and the static timing analysis tool of flow element 80. These LIBERTY timing models are stored in library flow element 42.

The simulations performed in flow element 40 may reflect various assumptions about such factors as (1) the process that will be used to manufacture the structured ASIC, (2) the voltage at which the structured ASIC will operate, and (3) the temperature (or temperature range) at which the structured ASIC will operate. (These factors are sometimes referred to as process, voltage, and temperature (or PVT) factors.) For example, simulations 40 may be performed assuming worst case PVT conditions. Alternatively, several different simulations may be performed using different assumptions about PVT. This can be done to facilitate use of the resulting timing information to support any of several different PVT structured ASIC implementations of the user's logic design.

As has been said, the results of simulations 40 are accumulated in timing models library 42. Thus for each physical library element 32 for which timing information will be needed, that timing information is available in timing models library 42. Libraries 32 and 42 are available as resources when a user's logic design is to be processed in order to produce a structured ASIC for implementing that design as will be described in paragraphs following this one. Because, as mentioned earlier, flow element 30 preferably includes many thousands of pre-built library models, flow elements 32 and 42 also preferably include corresponding large numbers of pre-built physical and timing models. Once again, these large numbers of pre-built physical and timing models are desirable for such purposes as reducing customer design turn-around time.

As has been mentioned, the handoff design files for a user's logic design include two main parts: (1) a netlist 52 for a structured ASIC implementation of the design, and (2) timing constraints 54 associated with the design. Netlist 52 is oriented toward production of a structured ASIC implementation of the user's logic design that is embodied in that netlist. For example, netlist 52 employs only circuit blocks for which physical elements exist in library 32 and for which, if necessary, timing models exist in library 42. In addition, netlist 52 preserves a substantial amount of information about the circuit blocks employed in the netlist. For example, netlist 52 preferably includes identifiers (referred to as "c-numbers" in the Schleicher et al. reference) of the circuit blocks employed that correlate with identifiers of corresponding circuit blocks in configurations 30 and therefore in libraries 32 and 42. The netlist 52 may also include "configuration" information for some types of circuit blocks. This configuration information tells the back end (i.e., the present invention) what configuration the circuit block is to have. For example, the netlist 52 circuit block information for an IO block 23 may reflect information about where the IO block must be located on the final structured ASIC product. This may affect both the layout of the various components of the IO block, and the placement of that IO block on the structured ASIC device. As another example, the netlist 52 information for a memory block 22 may include configuration information specifying configurable aspects of the memory block such as input bus width, output bus width, etc.

Examples of timing constraints that may be included in handoff design files component 54 include (1) definition of the Fmax clock frequency (e.g., 100 MHz, which implies a clock period of 10 ns), (2) an input interface timing requirement, (3) an output interface timing requirement, and (4) other similar timing requirements. To continue with the example of Fmax being 100 MHz, in that case the place and route tool in flow element 70 and the static timing analysis tool in flow element 80 will try to meet 10 ns for all register-to-register paths. (Of course, customer design compilation 50 will have included whatever timing checks are possible when producing netlists such as netlist 52.)

In accordance with the present invention, handoff design netlist 52 is operated on by flow element 60 to add to the netlist elements that are necessary and/or desirable in the final structured ASIC product but that are not generally of interest to or accessible by the user. For example, flow element 60 typically inserts clock networks and clock connections. Flow element 60 also inserts global signal connections such as global reset/preset etc. that are not in the customer design.

Flow element 60 also appends to the c-number of any circuit block, for which netlist 52 also includes appropriate configuration information, configuration data for that circuit block that will uniquely identify the physical library element 32 corresponding to that circuit block with that configuration. For example, the configuration information in netlist 52 may encode the states of the configuration RAM ("CRAM") bits needed to give a configurable logic block a particular configuration. Flow element 60 may append this CRAM bit code to the c-number for the circuit block to uniquely identify the corresponding physical library element 32.

Flow element 60 may also insert manufacturing test multiplexers (muxes) and test signal connections. (A very common circuitry of this type is so-called scan chain circuitry, which allows flip-flops on the device to be temporarily connected to one another in chains like shift registers. Data can be shifted into, through, and out of such register chains to test that the device has been manufactured properly.) Flow element 60 may also insert unused cells (e.g., HLEs, memory blocks, PLL blocks, etc., so that all resources of the target structured ASIC device are accounted for and handled properly, even if not used). Flow element 60 may also insert blocks that are not seen by customer design compilation flow element 50 (e.g., power-on-reset circuitry, calibration circuitry, fuses, etc.). Flow element 62 is the post-process netlist that results from the operation of step 60 on netlist 52.

After post-process netlist 62 has been produced, it may be desirable to check for logical equivalence between handoff netlist 52 and post-process netlist 62. This can be done by running a formal verification in user mode (as distinguished from test mode).

After post-process netlist 62 has been produced, everything is ready for the performance of step 70. Step 70 produces the final design of the structured ASIC that will implement the user's logic design. Data for actually specifying the masks that need to be customized to produce the structured ASIC (including the customization of those masks) is generated in step 70. Step 70 gets all necessary information about the user's logic design from flow elements 54 and 62. Step 70 employs library information from flow elements 32 and 42 in the processing of that user logic design information 54/62.

Step 70 includes performance of a number of sub-steps. These include (1) place and route operations, (2) scan re-ordering operations, (3) cross-talk closure operations, (4) antenna closure operations, (5) timing optimization, (6) design rule checker ("DRC") and layout vs. schematic ("LVS") verification operations, and (7) power and EM analysis. These will be considered one after another in the following paragraphs, although it should be noted that there may be some interaction among these operations that can cause re-performance of part of an operation that has already been performed to satisfy a requirement detected during performance of a subsequent operation.

The place and route portion of step 70 involves finding a physical layout in library 32 that is appropriate for implementing each circuit block specified in netlist 62. This may include taking into account placement constraints from customer design compilation 50 or that have come through compilation 50 from the customer. For example, an IO block that the customer has specified must have a certain pin-out location may need to have a generally corresponding location along the proper side of the finished structured ASIC device. The place and route portion of flow element 70 accommodates this placement requirement, in part by finding in library 32 the correct type of IO block implementation with the correct left-side, right-side, top, or bottom layout. The place and route portion of flow element 70 may also take into account customer timing constraints from handoff design files portion 54 and library timing performance information from timing models library 42. For example, if a timing requirement is not met due to long routing or high fanout, place and route tool 70 may insert a buffer with stronger drive strength if such a cell is available.

In addition to selecting from physical library 32 implementations of all the circuit blocks specified in netlist 62, the place and route portion of step 70 places all of those implementations physically on the available "real estate" and basic circuit resources of the structured ASIC template. Again, it will be remembered from earlier discussion that these template or base design layers (excluding programming layers) are fixed, so that the masks of these layers can be pre-built to save turn around time ("TAT") and non-recoverable engineering ("NRE") cost. Once a programmed design is placed and routed, the programmable metal layers and vias will have the customer design information and, together with base layers, form the complete structured ASIC product design. Thus only a few programmable layers need to be customized to the customer's design. In deciding where to place physical layouts from library 32 on the structured ASIC, the place and route portion of step 70 may again take into account applicable placement and timing constraints (e.g., from handoff design files portion 54). The place and route portion of step 70 also makes and physically lays out ("routes") all necessary connections between the physical layouts of the circuit blocks that have been selected from library 32 for use in implementing the circuit blocks specified in netlist 62. The place and route tool can work with the above-mentioned simplified "frame views" of physical library elements 32. At least initially these frame views include sufficient ports and blockage information to allow the place and route portion of flow element 70 to do its work. Later the full detail of library elements 32 can be pulled into flow element 70 (e.g., to allow full production of the data needed for tape out 90 of the structured ASIC product to be fabricated).

After the place and route portion of step 70 has been performed for the entire design specified in netlist 62, the registers in the scan chains inserted in step 60 may have lost the order contemplated in step 60. Accordingly, the scan re-ordering portion of step 70 is performed to effect any necessary re-ordering of the registers in the scan chains.

The cross-talk closure portion of step 70 is performed to look for patterns of interconnection conductors that may be conducive to cross-talk between conductors. For example, two conductors that are immediately adjacent to one another for a relatively long distance may cause cross-talk between them. If such a conductor pattern is found, the cross-talk closure portion of step 70 may change the physical routing of the conductors having a cross-talk risk to reduce or eliminate that risk.

The antenna closure portion of step 70 is performed to look for long wires that may collect charges strong enough to damage other circuitry of the device during the fabrication process. If any such long wires are detected, place and route modifications may be made to reduce or eliminate the risk of an antenna being undesirably present in the circuitry.

The timing optimization portion of step 70 may be performed to try to improve the performance of the results of the place and route operation with respect to timing. For example, the timing optimization portion of step 70 may look for relatively slow paths through the results of the place and route operation, and may then look for ways to speed up such relatively slow paths. Continuing with this example, a path may be relatively slow because it involves one or more relatively long interconnections between circuit blocks. The timing optimization portion of step 70 may try to speed up this path by inserting a strong buffer in the path or by increasing driving cell size (if such a cell is available) in order to satisfy set-up time requirements. As another example, a hold time problem can be fixed by inserting a buffer or delay cell to increase delay of the data path. It may also be possible to move cells to improve timing performance. It will be appreciated that the timing optimization portion of step 70 operates within (i.e., conforms to and does not violate) the timing constraints 54 specified by the customer's design. Indeed, the timing optimization portion of step 70 may be an aspect of how step 70 satisfies timing constraints 54.

The design rule checker ("DRC") portion of step 70 makes sure that whatever structured ASIC manufacturing "design rule" the user intends should be followed is not violated by any portion of the physical layout being developed for the structured ASIC in step 70. If necessary, the design rule checker portion of step 70 modifies the physical layout being developed so that the manufacturing design rule is not violated in any respect.

The layout vs. schematic (netlist) ("LVS") portion of step 70 checks the physical layout that is being developed to make sure that the physical layout correctly reflects the netlist. For example, this check makes sure the layout has the same connections as the netlist, that there are no short circuits, and the like.

From the foregoing, it will be appreciated that step 70 may have iterative aspects. For example, if DRC is performed toward the end of step 70, and if it causes some change in the earlier place and route results, then some or all of the intervening portions of step 70 may need to be performed again (e.g., to perform possible further scan re-ordering, to ensure that there is still cross-talk and antenna closure, to determine whether there is a need for more timing optimization, etc.).

Figure 2A:
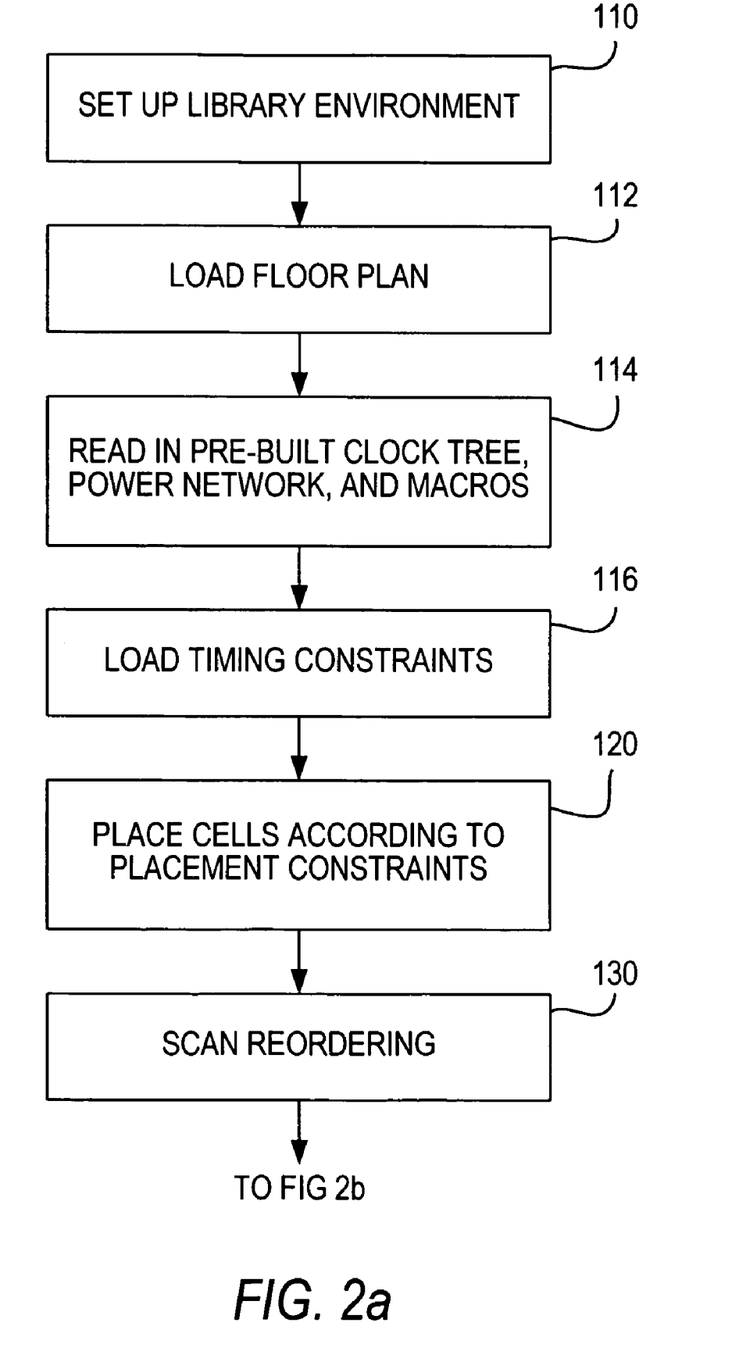
FIGS. 2a and 2b are collectively a simplified flow chart showing an illustrative embodiment of a portion of FIG. 1 in more detail.
Figure 2B:
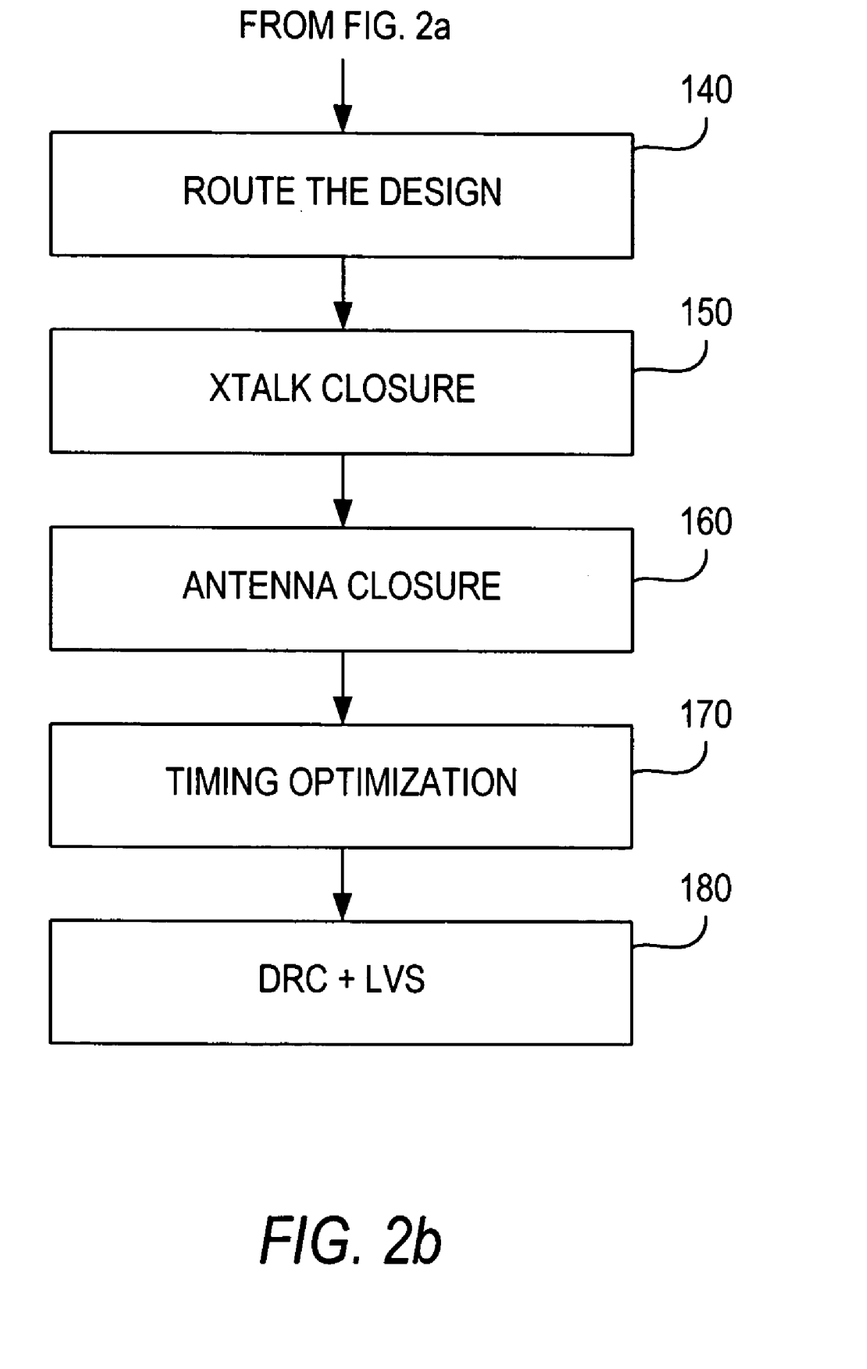

FIGS. 2a and 2b show an illustrative embodiment of place and route step 70 in more detail. In step 110 the appropriate library environment 32/42 is set up in or made available to the place and route tool. In step 112 the floorplan of the target structured ASIC device is loaded into the place and route tool. Elsewhere this floorplan information is referred to as the template or basic (fixed) circuitry of the target structured ASIC. In step 114 the pre-built clock tree, power network, and other macros are read in. Some or all of this may be information of the kind that is added as described above in connection with flow element 60. In step 116 the timing constraints (e.g., from flow element 54) are loaded.

In step 120 the cells from post-process netlist 62 are placed according to placement constraints. In step 130 any necessary scan reordering is performed. In step 140 all necessary connections between the blocks that have been placed are routed. In step 150 any likely crosstalk is eliminated (e.g., by appropriately rerouting connections). In step 160 any antenna issues are eliminated (e.g., by relocating elements as required). In step 170 timing optimization is performed. In step 180 design rule checking and layout vs. schematic verification are performed.

Again, although FIGS. 2a and 2b may suggest a purely unidirectional and one-time flow, it will be understood that the results of some later steps may cause a need for re-performance of one or more earlier steps, and that this may happen more than once in a variety of ways.

After all portions of step 70 have been performed, the result is a complete specification (physical layout) for the structured ASIC that is to be produced to implement the user's logic design. This complete physical layout is passed to step 80, which performs a static timing analysis on the design to make sure that all parts of the design satisfy static timing rules. If step 80 finds a violation of the static timing rules, it issues to step 70 an instruction (in the form of an engineering change order or "ECO") to change the design. For example, step 80 may find that a static timing rule is being violated because a register is too far from the source of the signal to be registered. Step 80 may therefore issue an engineering change order to step 70 specifying that the register must be no more than a certain distance from its signal source. Step 70 is then performed again with this additional constraint. This leads to a modified physical layout for the structured ASIC, which is again passed to step 80 for another static timing check.

The static timing analysis tool ("STA") 80 is used to sign off timing. Because this is for timing signoff, the RC analysis needs to be accurate. Accordingly, the placed and routed database from step 70 is passed to an accurate RC extraction tool to extract the RC characteristics of the design. With the extracted RC, the placed and routed netlist, and the timing constraints (e.g., from flow element 54), STA tool 80 analyzes the design to make sure that it meets the customer's timing specification. If the timing specification is not met, an auto-ECO flow back to flow element 70 is engaged. Based on the paths that fail timing, the ECO flow in STA tool 80 will generate commands for place and route tool 70 to make the necessary adjustment(s). Once place and route tool 70 completes the ECO change(s), STA flow 80 will be repeated until timing is passing in the STA.

When step 80 is performed without finding any static timing violations (or any further static timing violations), the structured ASIC layout is ready to be manufactured. The structured ASIC layout is therefore "taped out" in step 90 in the form of data that can be used to control the actual fabrication of the structured ASIC device.

Figure 3:
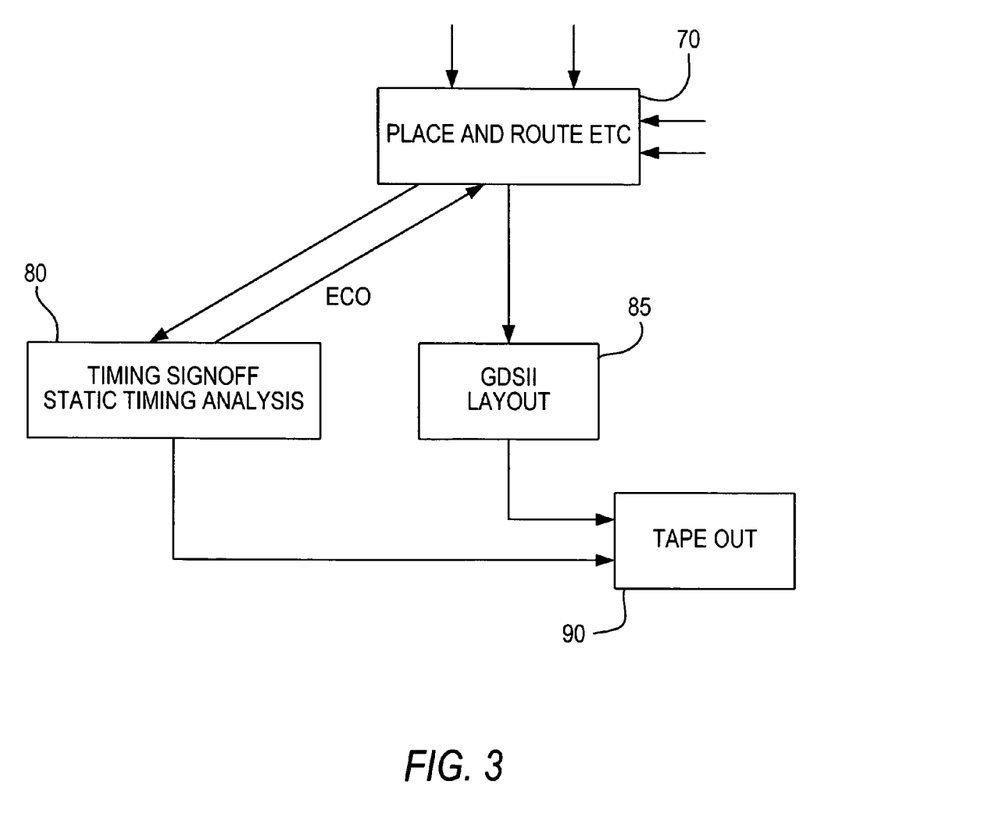
FIG. 3 is a simplified flow chart showing an illustrative embodiment of another portion of FIG. 1 in more detail.

FIG. 3 shows an illustrative embodiment of this portion of the flow in more detail. As compared to FIG. 1, FIG. 3 shows the addition of flow element 85, which captures the final, full and detailed, physical layout of the structured ASIC design in an industry-standard form of data ("GDSII") that can be fed to tape out step 90 when timing signoff (step 80) has been achieved.

It will be appreciated that the foregoing is consistent with goals stated in the Schleicher et al. reference (and reiterated herein) of producing structured ASICs that are functionally equivalent to FPGAs that are programmed to implement the same user's logic design that the structured ASIC is fabricated to implement. For example, netlist 52 is compiled (as in the Schleicher et al. reference) using the same library of structured ASIC resources (configurations 30 herein) that form the basis for doing the final physical layout of the structured ASIC in accordance with this invention. The same block-by-block approach that is followed in the Schleicher et al. compilation is continued herein. Radical resynthesis of the user's logic design for structured ASIC implementation is avoided. Instead, each FPGA circuit block 20 is replaced by a structured ASIC block that is known to be functionally equivalent. A large library 30 of such known-to-be-equivalent structured ASIC implementations of FPGA circuit blocks is drawn on in doing both the Schleicher et al. compilation and the structured ASIC physical layout herein. To avoid any significant logic resynthesis, the one-for-one correspondence between equivalent FPGA and structured ASIC circuit blocks is preserved throughout the entire process. This helps to give step 70 some freedom to move blocks around (e.g., to satisfy timing constraints and avoid problems like cross-talk, antenna creation, etc. ), without the risk of introducing logical errors into the structured ASIC device. The invention also allows user timing constraints 54 that have flowed through the Schleicher et al. compilation to be observed and implemented in the development of the physical layout for the structured ASIC. This further helps ensure functional equivalence of an FPGA and a structured ASIC implementing the same user logic design.

Figure 4:
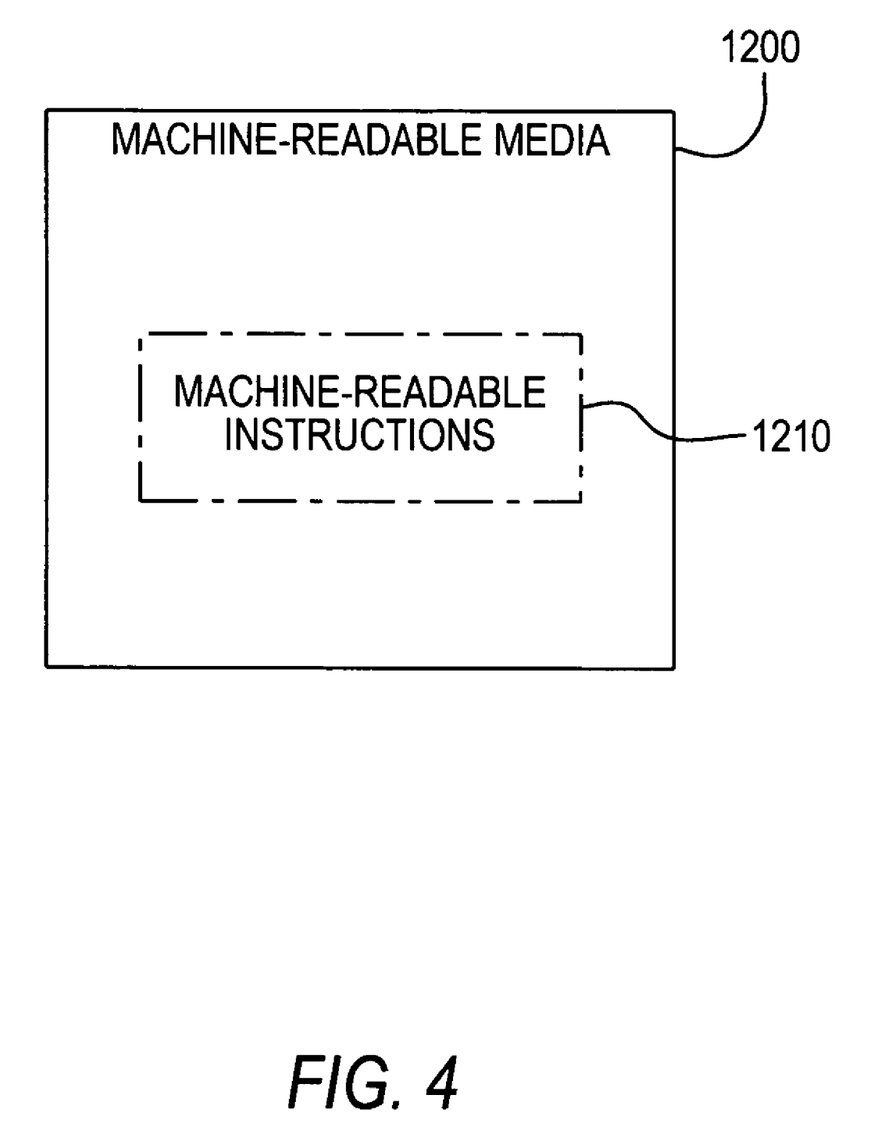
FIG. 4 is a simplified block diagram of illustrative machine-readable media in accordance with a possible aspect of the invention.

FIG. 4 illustrates another possible aspect of the invention. This is machine-readable media 1200 (e.g., magnetic disc(s), optical disc(s), magnetic tape(s), or the like) encoded with machine-readable instructions 1210 (e.g., a computer program) for at least partly performing one or more methods in accordance with the invention.

It will be understood that the foregoing is only illustrative of the principles of the invention, and that various modifications can be made by those skilled in the art without departing from the scope and spirit of the invention. For example, the order in which the various step 70 operations are performed can differ from what is shown in FIG. 1 or FIGS. 2*a* and 2*b* and described above.

What is claimed is:

1. A method of producing a physical layout for a structured ASIC that is functionally equivalent to an FPGA programmed to implement a user's logic design comprising:
    for each circuit block in a netlist for a structured ASIC implementation of the user's logic design, retrieving from a library of physical layouts of structured ASIC equivalents of FPGA circuit blocks a structured ASIC physical layout of that block;
    placing the physical layouts of the blocks on a structured ASIC template; and
    laying out on the structured ASIC template interconnections between the physical layouts of the blocks in accordance with the netlist.

2. The method defined in claim 1 further comprising:
    complying with at least one timing constraint supplied by the user in performing at least some aspect of at least one of the retrieving, placing, and laying out.

3. The method defined in claim 1 further comprising:
    adding to the netlist circuitry for facilitating testing of the structured ASIC after fabrication.

4. The method defined in claim 2 wherein for at least one circuit block the library contains an associated timing model, and wherein for that circuit block the retrieving comprises:
    also retrieving the associated timing model.

5. The method defined in claim 4 wherein the complying comprises:
    using the associated timing model.

6. The method defined in claim 1 further comprising:
    checking the physical layout for the structured ASIC for cross-talk possibilities.

7. The method defined in claim 1 further comprising:
    checking the physical layout for the structured ASIC for antenna possibilities.

8. The method defined in claim 1 further comprising:
    subjecting the physical layout of the structured ASIC to timing optimization.

9. The method defined in claim 1 further comprising:
    checking the physical layout for the structured ASIC for design rule violation.

10. The method defined in claim 1 further comprising:
    subjecting the physical layout for the structured ASIC to static timing analysis.

11. Machine-readable media encoded with machine-readable instructions for performing the method defined in claim 1.

12. A method of producing a structured ASIC that is functionally equivalent to an FPGA programmed to implement a user's logic design comprising:
    for each circuit block in a netlist for a structured ASIC implementation of the user's logic design, retrieving from a library of physical layouts of structured ASIC equivalents of FPGA circuit blocks a structured ASIC physical layout of that block;
    placing the physical layouts of the blocks on a structured ASIC template;
    laying out on the structured ASIC template interconnections between the physical layouts of the blocks in accordance with the netlist; and
    fabricating the structured ASIC in accordance with results of the placing and laying out.

13. The method defined in claim 12 wherein for at least some of the circuit blocks the library contains associated timing models, and wherein for such circuit blocks the retrieving comprises:
    also retrieving the associated timing models.

14. The method defined in claim 13 further comprising:
    using the associated timing models to ensure that predetermined timing constraints are not violated.

15. The method defined in claim 12 wherein for at least one type of the circuit blocks the structured ASIC implementation employs a variable number of a structured ASIC basic circuit unit having full capability that is less than the full capability of a basic circuit unit used for that type of circuit block in an FPGA, and wherein the placing places each circuit block of that type on the structured ASIC template using substantially only as many instances of the structured ASIC basic circuit unit as are required for the structured ASIC implementation of the circuit block.

16. A method of producing a structured ASIC that is functionally equivalent to an FPGA programmed to implement a user's logic design comprising:
    for each circuit block in a netlist for a structured ASIC implementation of the user's logic design, retrieving from a library of physical layouts of structured ASIC equivalents of FPGA circuit blocks a structured ASIC physical layout of that block and a timing model of that block;
    placing the physical layouts of the blocks on a structured ASIC template;
    laying out on the structured ASIC template interconnections between the physical layouts of the blocks in accordance with the netlist; and
    using the timing models to ensure that predetermined timing constraints are not violated.

* * * * *